US012588685B2

(12) United States Patent
Eisner et al.

(10) Patent No.: US 12,588,685 B2
(45) Date of Patent: Mar. 31, 2026

(54) PROTEIN INGREDIENT AND OIL PREPARATION FROM THE SEEDS OF MACAUBA FRUIT AND METHOD FOR PREPARING SAME

(71) Applicants: Fraunhofer-Gesellschaft zur Foerderung der angewandten Forschung e.V., Munich (DE); Instituto de Techologia de Alimentos (ITAL), Campinas-Sao Paulo (BR)

(72) Inventors: Peter Eisner, Freising (DE); Stefanie Mittermaier, Freising (DE); Isabel Muranyi, Freising (DE); Gabriele Doer, Freising (DE); Sérgio Henrique Toledo E Silva, Freising (DE); Roseli Aparecida Ferrari, Campinas-Sao Paulo (BR); Alexandre Martins Moreira, Valinhos-Sao Paulo (BR); Lidiane Bataglia Da Silva, Campinas-Sao Paulo (BR); Carlos Colombo, Campinas-Sao Paulo (BR)

(73) Assignee: FRAUNHOFER-GESSELSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 475 days.

(21) Appl. No.: 17/799,417

(22) PCT Filed: Feb. 15, 2021

(86) PCT No.: PCT/EP2021/053612
§ 371 (c)(1),
(2) Date: Aug. 12, 2022

(87) PCT Pub. No.: WO2021/160877
PCT Pub. Date: Aug. 19, 2021

(65) Prior Publication Data
US 2023/0337697 A1 Oct. 26, 2023

(30) Foreign Application Priority Data
Feb. 14, 2020 (DE) .................... 10 2020 103 909.3

(51) Int. Cl.
| | |
|---|---|
| *A23J 1/14* | (2006.01) |
| *A23D 9/02* | (2006.01) |
| *A23K 10/37* | (2016.01) |
| *A23L 33/185* | (2016.01) |

(52) U.S. Cl.
CPC ................. *A23J 1/14* (2013.01); *A23D 9/02* (2013.01); *A23K 10/37* (2016.05); *A23L 33/185* (2016.08)

(58) Field of Classification Search
CPC ..... A23J 1/14; A23J 1/142; A23J 3/14; C11B 1/06; C11B 1/10
See application file for complete search history.

(56) References Cited

U.S. PATENT DOCUMENTS 10,051,878 B2 * 8/2018 Helling .................. A23K 10/37

FOREIGN PATENT DOCUMENTS

WO WO-2006006845 A1 * 1/2006 ................ A23J 1/14

OTHER PUBLICATIONS

Silva "Development and simulation of a new oil extraction process from fruit of macauba palm tree", J. Food Proc. Eng. 2013, 36: 134-145, https://doi.org/10.1111/j.1745-4530.2011.00657.x (Year: 2013).*

Evaristo Anderson Barbosa et al: "Actual and putative potentials of macauba palm as feedstock for solid biofuel production from residues", Biomass and Bioenergy, Pergamon, Amsterdam, NL Bd. 85, Dec. 17, 2015 (Dec. 17, 2015), pp. 18-24, XP 029391350, ISSN:0961-9534.

Ali Beshir M et al: "Enviromental and economic impacts of using co-products in the diets of finishing pigs in Brazil", Journal of Cleaner Production, Elsevier, Amsterdam, NL Bd. 162, Jun. 9, 2017 (Jun. 9, 2017), pp. 247-259, XP085133935, ISSN: 0959-6526.

Del Río José C et al: "Chemical composition and thermal behavior of the pulp and kernal oils from macauba palm (*Acrocomia aculeata*) fruit ", Industrial Crops and Products, Elsevier NL, Bd. 54, Feb. 16, 2016 (Feb. 16, 2016) pp. 294-304.

Cardoso Alexandre et al: "Opportunities and challenges for sustainable production of A. aculeatathrough agroforestry systems", Industrial Crops and Products, Bd. 107, Apr. 22, 2017 (Apr. 22, 2017),pp. 573-580.

Nunes Vanessa O et al: "The specification of the organic compounds of slow pyrolysis bio-oils from Brazilian tropical seed cake fruits using high-resolution techniques: GC x GC-TOFMS and ESI ( )-Orbitrap HRMS", Michrochemical Journal, New York NY, US, Bd. 153, Dec. 9, 2019 (Dec. 9, 2019), XP086008633, ISSN:0026-265X.

Hiane Priscila A et al: "Chemical and nutritional evaluation of kernels of Bocaiuva, Acrocomia aculeata (JACQ.) LODD" , Cienc. Tecnol. Aliment., 2006, pp. 683-689, XP055801293, found on the internet: URL: http://www.scielo.br/pdf/cta/v26n3/31775.pdf [date searched May 4, 2021] pp. 683-684.

Pires Thiago Pereira et al: "Ecophysiological traits of the macaw palm: A contribution towards the domestication of a novel oil crop", Industrail Crops and Products, Bd. 44, 2013, pp. 200-210, XP055801155, NL ISSN:0926-6690, J. Indcrop. Sep. 2012.

* cited by examiner

*Primary Examiner* — Michele L Jacobson
(74) *Attorney, Agent, or Firm* — Renner Kenner Greive Bobak Taylor & Weber Co., LPA

(57) ABSTRACT

The present invention relates to a protein ingredient and an oil preparation from seeds of macauba fruit and a method for producing same. The protein preparation has a protein content more than 15% by weight, advantageously more than 30% by weight, and a fat content less than 60% by weight, advantageously less than 25% by weight. The protein ingredient can be produced with light colour and good techno-functional properties. It has attractive sensory properties, and is thus usable for a wide range of applications in foodstuffs, pet food and also for cosmetics.

12 Claims, No Drawings

PROTEIN INGREDIENT AND OIL PREPARATION FROM THE SEEDS OF MACAUBA FRUIT AND METHOD FOR PREPARING SAME

FIELD OF APPLICATION

The invention relates to functional protein ingredients for foodstuff, cosmetics and pet food from the seeds of macauba fruit, a method for preparing said ingredients, and an oil preparation obtained from the seeds.

RELATED ART

As farmland and resources become more and more scarce, the importance of plant-based protein ingredients for feeding people and for use in pet food and cosmetics is increasing correspondingly. The growing demand for high-quality foodstuff is creating a growing need for nutritionally and techno-functionally optimised protein ingredients which can be provided simply and inexpensively, and whose manufacture does not entail excessive consumption of resources. Inexpensive preparations may be provided for example from the residues of manufacturing vegetable oil, e.g., from the residues from the production of sunflower, linseed or rapeseed oil. However, the press cakes produced in these processes have considerable sensory weaknesses in terms of colour, taste, composition and smell. They are also associated with nutritional deficiencies due to the high concentrations of phytochemical substances they contain, including phenolic acids, glucosinolates or cyanogenic compounds. This limits their use in human foods significantly.

Besides other oil plants, the fat-rich kernels of largely unknown fruits are emerging as a new, sustainable source for obtaining cooking oil. For the purposes of this patent application, these are the seeds of macauba fruit.

Macauba fruit consists of several different parts, the epicarp (husk), the mesocarp (pulp), the endocarp (inner shell), and a fat-rich kernel (endosperm) which is coated with a thin, dark skin (integument). Until now, the oil has occasionally been extracted by squeezing from the endosperm, which has a protein content between 14.0 and 30.1%, as disclosed for example in BR 102012029493 A2. That document also describes a method for manufacturing animal feed on the basis of by-products of macauba fruit. The use of the press cakes for high-quality applications in foodstuff, pet food or cosmetics is not described in the document. The residues previously obtained by pressing the abovementioned fruit seeds are brown to black in colour which until now has limited their appeal for use in foodstuffs, pet food or cosmetics.

OBJECT OF THE PRESENT INVENTION

The object of the present invention was to provide functional plant based, protein-containing ingredients which were attractive to the senses and an oil preparation, and to describe a simple, inexpensive method for producing same. In advantages forms, the ingredients should be as pale in colour as possible and have good techno-functional properties such as binding oil or water. In addition, they should advantageously also have attractive sensory properties, such as neutral smell and taste, allowing them to be used as widely as possible in foodstuffs.

DESCRIPTION OF THE INVENTION

This object is solved with the protein ingredient, the oil preparation and the method according to the claims that follow this specification. Advantageous variants of the protein ingredient and the method are the objects of the dependent claims or may be discerned from the following description and the embodiments.

In the context of the present invention, it was found that despite the very dark, even black, colour of the kernels, residues from the recovery of oil from macauba fruit kernels can be used as protein-containing and/or techno-functional ingredients for the manufacture—particularly the industrial manufacture—of foodstuffs, pet food or cosmetics. These ingredients have properties according to the invention which can be preserved with the described method for their manufacture and the corresponding process variations.

For the purposes of the present invention, the kernel of the macauba fruit is understood to consist of the endosperm together with the dark integument (testa).

The properties according to the invention of the protein-containing ingredients of the macauba fruit are as follows:

fat content less than 60% by weight, to avoid caking when adding to foodstuffs in metered amounts preferably less than 25% by weight, advantageously less than 5% by weight, especially less than 3% by weight, particularly advantageously less than 2% by weight. Especially with fat contents below 2% by weight, the ingredients have good storage stability, because the formation of aroma-active products of lipid breakdown is largely avoided.

protein content more than 15% by weight, advantageously more than 30% by weight, preferably more than 35% by weight and more than 50% by weight, particularly advantageously more than 70, more than 80 or more than 90% by weight.

In preferred variants, the protein ingredients have good techno-functional properties, particularly one or more of the following properties:

emulsifying activity index (calculated by measuring turbidity) more than 30 $m^2/g$ ingredient, advantageously more than 50 $m^2/g$ ingredient, particularly advantageously more than 100 $m^2/g$ ingredient protein solubility at pH 7.0 and 0.1 mol/l NaCl more than 10%, advantageously 15%, preferably more than 20%;

protein solubility at pH 7.0 and 0.5 mol/l NaCl more than 30%, advantageously more than 40%, particularly advantageously more than 50%, preferably more than 60%;

water binding (water remaining in the ingredient after the addition of water in excess, centrifuging and decanting the excess water) more than 1 ml/g ingredient, advantageously more than 2.0 ml/g ingredient, particularly advantageously more than 4.0 ml/g ingredient;

oil binding (oil remaining in the ingredient after the addition of oil in excess, centrifuging and decanting the excess oil) more than 1.0 ml/g ingredient, advantageously more than 1.5 ml/g ingredient, particularly advantageously more than 2.0 ml/g ingredient;

minimum gelling concentration less than 10.0%, preferably less than 8.0%, particularly advantageously less than 6.0%.

light colour, determined according to CIE-L*a*b* colorimetry with a L* value more than 50, advantageously more than 70, preferably more than 80, particularly advantageously more than 90. The paler preparations become as a result of corresponding processing, the wider the range of their possible uses becomes, in higher quality and more colour-sensitive applications such as beverages or yoghurt or cheese-like fermented products.

Surprisingly, it has been found that despite a simple, inexpensive manufacturing process as will be described later, these ingredients have a very neutral taste, good sensory properties, and good functional properties for foodstuffs and pet food. Consequently, despite the low production costs, this opens up the availability of a range of attractive ingredients for manufacturing foodstuffs as well as for pet food or cosmetics.

Description of the Method According to the Invention

1) The macauba kernels are separated mechanically from the respective fruit fractions, i.e. epicarp, mesocarp and endocarp. Besides this separation, it is also advantageous to subject them to heat treatment and/or moistening or drying to make the mechanical separation of the kernels easier. It is optional and advantageous to separate the dark integument partially or completely from the kernels before the subsequent extraction of oil. Alternatively, kernels from which the integument has not been removed, or partially or completely removed may be provided at this early point. If the integument has not been separated, the subsequent steps 2) and 3) result in a dark grey product, partial separation yields a grey-white product (brightness value L more than 70). When the subsequent steps 2) and 4) are carried out, a pale grey-white product (brightness value L usually higher than 80, sometimes higher than 90) is obtained both without and with at least partial separation of the integument.

2) Mechanical pressing of the kernels, advantageously in a continuous press, particularly advantageously in a screw press (optionally: following a prior, coarse comminution step such as crushing, grinding or flaking) for partial separation of the fat, to obtain residual fat contents less than 30% by weight, advantageously less than 25% by weight, preferably less than 20% by weight, particularly advantageously less than 15% by weight, less than 10% by weight or less than 8% by weight. Typical values are in the range between 7 and 25% by weight.

3) Grinding the residue into a powder, grit of flour which can be delivered in metered quantities, with a D90 volume particle size (i.e. 90% of the sample volume consists of particles with a diameter smaller than this value) less than 2 mm, preferably less than 1 mm, advantageously less than 500 µm, still more preferably less than 250 µm, particularly advantageously less than 100 µm. Alternatively, the residue can also be broken down into flakes having a thickness less than 2 mm, preferably less than 1 mm, advantageously less than 500 µm, particularly advantageously less than 350 µm.

4) Alternatively or following step 3): Removing the residual fat using solvents (organic solvent such as hexane, ethanol or similar, or supercritical $CO_2$) from the residue to obtain values less than 5% by weight, advantageously less than 3% by weight, particularly advantageously less than 2% by weight, and/or treating the de-oiled or fat-containing residues with mixtures of water and alcohol, advantageously water with ethanol or water with propanol. Typical values for the fat content after the treatment with solvent are in the range between 0.1 and 5% by weight. Then, grinding the defatted residues to a D90 volume particle size less than 2000 µm, preferably less than 1000 µm, advantageously less than 500 µm, still more preferably less than 250 µm, particularly advantageously less than 100 µm. Alternatively, here too the defatted residue may be flaked to obtain flake thicknesses similar to those in step 3). In this way, a very neutral smelling ingredient with high storage stability may be obtained, which can be applied directly in foodstuffs after grinding or flaking.

5) Optionally and advantageously: partial or complete separation of the dark pigmented integument of the kernels from the white endosperm, by peeling or polishing the kernels before pressing, or cutting off outer parts of the endosperm, thereby reducing the proportion of brown or black integument of the endosperms by more than 10%, preferably more than 25%, preferably more than 50%, more preferably still more than 75%, advantageously more than 90%, particularly advantageously more than 99%. The percentages refer to the fraction of the area on the surface of the kernels relative to the kernels that are still coated with a complete integument. This separation serves to bring about a corresponding lightening of the colour of the powder, grit or flour and of the flakes.

6) Optionally and advantageously: after pressing and/or deoiling with solvents and grinding: Winnowing and separating dark particles from the powder/grit/flour or the flakes by more than 10% by weight, preferably more than 50% by weight particularly advantageously more than 90% by weight. In this context, separation of the dark components is understood to mean that particles which contain the fractions of the dark integument are separated from the particles which do not contain any fractions of dark integument.

7) Optionally and advantageously: The macauba protein ingredients obtained, which are produced by the methods described, might be used for further protein enrichments and protein fractionations. In such case, an aqueous extraction process might ideally be used to separation water-soluble proteins and insoluble components. This extraction is advantageously carried out after the mechanical deoiling or after the solvent-based deoiling. For this purpose, the protein flour or the protein flakes (deoiled and ground or flaked residue) is/are preferably dispersed in water or in water or an aqueous NaCl solution (concentration 0.01-0.5 mol/L) and with a pH value of 7-9, preferably 8.0. Then, the solid residue is separated from the liquid extract. The dissolved proteins are separated out of the liquid extract by the use of precipitating and/or filtration processes. The precipitation takes place advantageously by adjusting the pH value to a value in the range from 3.0 to 5.0, preferably 3.5. The liquid supernatant is separated from the precipitated proteins by centrifugation and/or filtration. The protein fraction thus obtained is advantageously dried. In this way, a protein isolate is obtained which can have a protein content of more than 70, more than 80 or even more than 90% by weight.

8) Optionally and advantageously: After the solvent deoiling and grinding, the residue obtained is in the form of "protein flour". This can be treated using sieving processes or air classifying processes to achieve a separation of protein-rich fractions from protein-poor factions using dry methods, or to separate fractions that contain more soluble protein from fractions that contain less soluble protein.

The of the abovementioned dry separation process separates the protein flour into at least two different fractions, one with higher protein content and one with lower protein content. When sieving processes are employed, it is preferable to work with an aperture diameter from 2 mm to 50 μm. The sieves may also be arranged one behind the other.

Air classifying may be carried out using various classifying methods such as gravity sifting in the counterflow or crossflow, or centrifuge sifting in the counterflow or crossflow. Consequently, the increase in protein content according to the invention may be equal to more than 25%, preferably more than 35%, particularly advantageously greater than 50%, occasionally more than 60% relative to the protein content in the dry mass in the protein flour. This protein enrichment improves the functional and sensory properties compared to the unenriched protein flour, so that enriched fractions are more suitable for use as ingredients in foodstuffs, pet food and cosmetic products. The dark integument of the kernels may also be separated using the described techniques, e.g., by sifting or classifying, due to the difference in specific weight compared with the white endosperm.

The following text contains a brief description of the determination methods which are used for the quantitative characterization of the protein ingredients produced:

Protein Content

The protein content is defined as the content that is calculated from the determination of the nitrogen in a sample and multiplying this determined value by a factor of 6.25. In the present patent application, the protein content is stated as a percentage relative to the dry mass (TS).

Colour

The perceived colour is defined using CIE-L*a*b* colorimetry (cf. DIN 6417). In this context, the L* axis indicates the brightness, wherein black has the value 0 and white has the value 100, the a* axis describes the green or red component, and the b* axis describes the blue or yellow component.

Protein Solubility

Protein solubility is determined using determination methods according to Morr et al. 1985, see the journal article: Morr C. V., German, B., Kinsella, J. E., Regenstein, J. M., Van Buren, J. P., Kilara, A., Lewis, B. A., Mangino, M. E, "A Collaborative Study to Develop a Standardized Food Protein Solubility Procedure. Journal of Food Science", Volume 50 (1985) pages 1715-1718).

The Emulsification Activity Index is determined as described inwird wie in Pearce, K. N., Kinsella, J. E. Emulsifying properties of proteins: evaluation of a turbidimetric technique. Journal of Agricultural and Food Chemistry, v. 26, p. 716-723, 1978.

Fat content: The fat content is determined gravimetrically with the Sohxlet method, in which the sample material is brought into contact with an organic solvent (hexane or petroleum ether) repeatedly for at least six hours. The extracted oil is measured after the solvent has evaporated.

Minimum gelling concentration: This is determined by preparing various suspensions of the protein ingredient in 0.1 mol/L sodium phosphate buffer solution in concentrations of 2%, 4%, 6%, 8%, 10%, 12%, 14%, 16%, 18%, 20% (% by weight in each case) in test tubes. The suspensions are heated to 95° C. for one hour in a water bath and then cooled rapidly and stored at 4° C. for two hours. The minimum gelling concentration is the concentration at which the sample does not run out of the test tube when the test tube is inverted.

Method Example 1

1000 g macauba fruit kernels with intact dark integument were coarsely reduced to an edge length of less than 5 mm in a crusher and pressed in a hydraulic press at room temperature. In the process, the expressed oil was collected. The remaining press cake had a residual oil content of 30% by weight and a protein content of 25% by weight. After grinding the press cake to a particle size less than 1000 μm, the macauba flour was added to a chocolate sponge cake in a percentage by weight of 3%, resulting in a protein-enriched cake with no significantly negative sensory effect.

Method Example 2

1000 g macauba fruit kernels with intact dark integument underwent surface treatment with a peeling device, with the result that after the treatment almost the entire surface of the kernels was free of dark integument. Then, the kernels were coarsely reduced to an edge length of less than 3 mm, heated to 50° C., and pressed in a screw pres. In the process, the expressed oil was collected. The press cake that emerged from the screw press contained a residual oil content of 23% by weight and a protein content of 29% by weight. After the press cake was flaked to a flake thickness less than 500 μm, the flakes were deoiled using hexane, after which the protein content had a value of 33% by weight. This was followed by grinding to less than 250 μm. This white flour was processed for produce a wet-textured meat alternative. The sensory properties of the meat alternative very good, the colour was unusually light.

Method Example 3

100 g of the white flour from Example 2 was added to 1000 ml of an aqueous-alcohol solution (50-50% by weight), so that sugars, other alcohol-soluble carbohydrates and phytochemical substances were dissolved out of the flour. After the supernatant was decanted, the residue was dried and ground again, finely. The white powder was worked into a mayonnaise proportion in mixtures with egg. In the finished mayonnaise, it was impossible to detect with the senses that a vegetable protein had been added.

Method Example 4

1 kg of the white flour produced as in Example 2 was added to 10 litres of aqueous NaCl solution (0.25 mol/l) at a pH of 8 and stirred for 1 hour. In this process, some of the protein passed out of the flour and into the aqueous phase. The raffinate was forced out of the protein solution by centrifuging. In order to concentrate the protein, the solution was treated by ultrafiltration and the protein in the retentate was held back and then diafiltered. The concentrated protein was then dried. The isolate obtained in this way had a protein content in dry mass of 85% and good emulsifying capability, and could be used as a substitute for milk protein when making ice cream.

Percentage of Sterols in Macauba Oil for Various
Process Variants

| | pressed with dark integument mg/l | pressed without dark integument mg/l |
| --- | --- | --- |
| Sterols | >81 | <80 |

The invention claimed is:

1. Method for producing a protein ingredient from seeds of macauba fruit, with at least the following steps:

providing kernels of the fruits;

mechanical pressing of the kernels for partial separation of the fat or oil to residual fat contents of less than 30% by weight, in which separated fat or oil and a residue is obtained; and grinding the residue to form a powder, grit or flour dispensable in metered quantities with a D90 volume particle size less than 2 mm, or flaking the residue into flakes with a thickness of less than 2 mm, as a ground or flaked product, which is usable directly or optionally after further processing as a protein ingredient, and/or removal of fat or oil remaining in the residue by means of one or more solvents to a residual fat content in the residue of less than 5% by weight, to obtain a defatted residue, and either grinding the defatted residue to produce a powder, grit or flour dispensable in metered quantities with a D90 volume particle size less than 2 mm, or flaking the defatted residue to form flakes with a thickness of less than 2 mm, as a ground or flaked product, which is usable directly or optionally after further processing as a protein ingredient, wherein dark integument remaining on the kernels is partially or completely separated from the kernels by peeling or polishing of the kernels, or by cutting off outer parts of the endosperm, so that a reduction by more than 10% of the fraction of brown or black integument in the ground or flaked product is achieved.

2. Method according to claim 1, in which the provision of the kernels comprises at least the step of mechanical separation of the kernels from the epicarp, mesocarp and endocarp of the macauba fruit.

3. Method according to claim 2, in which the provision of the kernels additionally comprises carrying out a heat treatment and/or moistening or drying to facilitate a mechanical separation of the kernels.

4. Method according to claim 1, in which the mechanical pressing of the kernels takes place in a continuous press.

5. Method according to claim 1, in which the mechanical pressing is carried out until a residual fat content of less than 20% by weight is obtained.

6. Method according to claim 1, in which the mechanical pressing is carried out until a residual fat content of less than 10% by weight is obtained.

7. Method according to claim 1, in which the grinding of the residue is carried out to obtain a powder or flour with a D90 volume particle size less than 250 μm.

8. Method according to claim 1, in which the residue is treated with one or more mixtures of water and alcohol.

9. Method according to claim 1, in which dark integument remaining on the kernels is partially or completely separated from the kernels before the mechanical pressing by peeling or polishing of the kernels or by cutting off outer parts of the endosperm, so that a reduction by more than 50%, of the fraction of brown or black integument in the ground or flaked residue is achieved.

10. Method according to claim 1, in which after grinding or flaking of the residue, more than 10% by weight of dark components are separated from the ground product.

11. Method according to claim 1, in which the ground or flaked product obtained from the kernels is subjected to an aqueous extraction process for separating water-soluble proteins and insoluble components, wherein after a separation of a solid residue proteins dissolved in the liquid extract are separated from the liquid extract by the application of precipitating and/or filtration processes, and the liquid supernatant is separated by centrifuging and/or filtration from the precipitated proteins, which then constitute the protein ingredient.

12. Method according to claim 1, in which the ground product is separated by means of sieving processes or air classifying processes into at least two fractions with different protein content, of which one fraction forms the protein ingredient which has a protein content more than 25% higher than the ground product in the dry mass.

\* \* \* \* \*